United States Patent
Bui et al.

(10) Patent No.: US 10,204,649 B2
(45) Date of Patent: Feb. 12, 2019

(54) CALIBRATION OF HIGH-DENSITY SERVO PATTERN DETECTOR PARAMETERS

(71) Applicant: International Business Machines Corporation, Armonk, NY (US)

(72) Inventors: Nhan X. Bui, Tucson, AZ (US); Giovanni Cherubini, Rueschlikon (CH); Simeon Furrer, Altdorf (CH); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/967,355

(22) Filed: Apr. 30, 2018

(65) Prior Publication Data

US 2018/0268851 A1 Sep. 20, 2018

Related U.S. Application Data

(63) Continuation of application No. 15/461,348, filed on Mar. 16, 2017, now Pat. No. 10,026,428.

(51) Int. Cl.
*G11B 5/588* (2006.01)
*G11B 20/12* (2006.01)
*G11B 5/008* (2006.01)

(52) U.S. Cl.
CPC .......... *G11B 5/588* (2013.01); *G11B 5/00878* (2013.01); *G11B 20/1211* (2013.01)

(58) Field of Classification Search
None
See application file for complete search history.

(56) References Cited

U.S. PATENT DOCUMENTS

| | | |
|---|---|---|
| 7,136,257 B2 | 11/2006 | Zhang et al. |
| 7,365,929 B2 | 4/2008 | Cherubini et al. |
| 7,480,114 B2 | 1/2009 | Cherubini et al. |
| 7,511,912 B2 | 3/2009 | Wilson et al. |
| 7,583,468 B2 | 9/2009 | Sharma et al. |
| 7,742,254 B2 | 6/2010 | Cherubini et al. |
| 7,869,157 B2 | 1/2011 | Nagashima et al. |
| 7,903,360 B2 | 3/2011 | Cherubini et al. |
| 8,154,811 B2 | 4/2012 | Barsotti et al. |
| 9,053,744 B2 | 6/2015 | Cherubini et al. |

(Continued)

OTHER PUBLICATIONS

Furrer et al, "Analytical Expressions for the Readback Signal of Timing-Based Servo Schemes," IEEE Transactions on Magnetics, vol. 48, No. 11, Nov. 2012, pp. 4578-4581.
Barrett et al., "Timing-Based Track-Following Servo for Linear Tape Systems," IEEE Transactions on Magnetics, vol. 34, No. 4, Jul. 1998, pp. 1872-1877.
Cherubini et al., U.S. Appl. No. 11/969,184, filed Jan. 3, 2008.
Cherubini et al., U.S. Appl. No. 14/646,084, filed May 20, 2015.

(Continued)

*Primary Examiner* — K. Wong
(74) *Attorney, Agent, or Firm* — Zilka-Kotab, P.C.

(57) ABSTRACT

A tape drive-implemented method, according to one embodiment, includes: causing a servo reader to move in a first direction over a high-density servo pattern which includes a plurality of high-density servo tracks. Each of the servo tracks includes at least two patterns written at different frequencies to produce different periodic waveforms during readback. Moreover, a readback signal is received from the servo reader as the servo reader moves in the first direction. The readback signal is used to set a gain parameter for each of the respective periodic waveforms. Other systems, methods, and computer program products are described in additional embodiments.

20 Claims, 11 Drawing Sheets

(56) References Cited

U.S. PATENT DOCUMENTS

| | | | |
|---|---|---|---|
| 9,058,828 B1 | 6/2015 | Cherubini et al. | |
| 9,177,571 B2 | 11/2015 | Cherubini et al. | |
| 9,251,827 B2 | 2/2016 | Cherubini et al. | |
| 9,305,580 B2 | 4/2016 | Cherubini et al. | |
| 9,411,022 B2 | 8/2016 | Berman et al. | |
| 9,495,986 B2 | 11/2016 | Cherubini et al. | |
| 9,524,741 B1 | 12/2016 | Cherubini et al. | |
| 10,026,428 B1 * | 7/2018 | Bui | G11B 5/588 |
| 2008/0024904 A1 | 1/2008 | Cherubini et al. | |
| 2008/0151416 A1 | 6/2008 | Cherubini et al. | |
| 2009/0040643 A1 | 2/2009 | Weng et al. | |
| 2009/0174964 A1 | 7/2009 | Cherubini et al. | |
| 2010/0073800 A1 | 3/2010 | Cherubini et al. | |
| 2015/0318006 A1 | 11/2015 | Cherubini et al. | |

OTHER PUBLICATIONS

Cherubini et al., U.S. Appl. No. 14/278,881, filed May 15, 2014.
Cherubini et al., U.S. Appl. No. 14/929,227, filed Oct. 30, 2015.
Cherubini et al., U.S. Appl. No. 11/460,987, filed Jul. 30, 2006.
Cherubini et al., U.S. Appl. No. 12/044,950, filed Mar. 8, 2008.
Cherubini et al., U.S. Appl. No. 12/236,450, filed Sep. 23, 2008.
Bui et al., U.S. Appl. No. 15/461,348, filed Mar. 16, 2017.
Non-Final Office Action from U.S. Appl. No. 15/461,348, filed Sep. 20, 2017.
Notice of Allowance from U.S. Appl. No. 15/461,348, dated Mar. 14, 2018.
U.S. Appl. No. 15/967,355, filed Apr. 30, 2018.
U.S. Appl. No. 15/461,348, filed Mar. 16, 2017.
List of IBM Patents or Patent Applications Treated As Related.

\* cited by examiner

CALIBRATION OF HIGH-DENSITY SERVO PATTERN DETECTOR PARAMETERS

BACKGROUND

The present invention relates to tape storage systems, and more specifically, to calibrating high-density (HD) servo detector parameters.

Timing-based servo (TBS) is a technology which was developed for linear tape drives in the late 1990s. In TBS systems, recorded servo patterns include transitions with two different azimuthal slopes, thereby forming a chevron-type pattern. These patterned transitions allow for an estimate of the head lateral position to be determined by evaluating the relative timing of pulses generated by a servo reader reading the patterns as they are passed over the servo reader.

In a TBS format, the servo pattern is prerecorded in several bands distributed across the tape. Typically, five or nine servo pattern bands are included on a given tape which run about parallel to a longitudinal axis of the tape. Data is recorded in the regions of tape located between pairs of the servo bands. In read/write heads of IBM linear tape-open (LTO) and Enterprise tape drives, two servo readers are normally available per head module, from which longitudinal position (LPOS) information as well as a position error signal (PES) may be derived. Effective detection of the TBS patterns is achieved by a synchronous servo channel employing a matched-filter interpolator/correlator, which ensures desirable filtering of the servo reader signal.

With the increase in track density that is envisioned for future tape media and tape drives, efficiently controlling the lateral position of the head and/or skew of the head with respect to tape by using feedback generated by reading the TBS patterns becomes increasingly difficult. Conventional servo based implementations may not be sufficiently accurate to ensure adequate positioning accuracy of the data readers and writers that move along data tracks. Furthermore, the repetition rate of the head lateral position estimates may be too low to ensure proper track-following operation as tape velocity varies during use. The repetition rate of the head lateral position estimates may additionally be unable to support future actuators with larger bandwidths.

Some magnetic tapes may further be augmented with additional features that provide additional functionality. Accordingly, HD servo patterns may be implemented in place of, or in addition to, the standard TBS servo patterns.

SUMMARY

A tape drive-implemented method, according to one embodiment, includes: causing a servo reader to move in a first direction over a high-density servo pattern which includes a plurality of high-density servo tracks. Each of the servo tracks includes at least two patterns written at different frequencies to produce different periodic waveforms during readback. Moreover, a readback signal is received from the servo reader as the servo reader moves in the first direction. The readback signal is used to set a gain parameter for each of the respective periodic waveforms.

A computer program product, according to another embodiment, includes a computer readable storage medium having program instructions embodied therewith. The computer readable storage medium is not a transitory signal per se. Moreover, the program instructions executable by a processor to cause the processor to: cause, by the processor, a servo reader to move in a first direction over a high-density servo pattern which includes a plurality of high-density servo tracks. Each of the servo tracks includes at least two patterns written at different frequencies to produce different periodic waveforms during readback. Moreover, a readback signal is received, by the processor, from the servo reader as the servo reader moves in the first direction. The readback signal is used, by the processor, to set a gain parameter for each of the respective periodic waveforms.

A tape drive, according to yet another embodiment, includes: a controller comprising logic integrated with and/or executable by the controller to cause the controller to: cause a servo reader to move in a first direction over a high-density servo pattern which includes a plurality of high-density servo tracks. Each of the servo tracks includes at least two patterns written at different frequencies to produce different periodic waveforms during readback. Moreover, a readback signal is received from the servo reader as the servo reader moves in the first direction. The readback signal is used to set a gain parameter for each of the respective periodic waveforms.

Other aspects and embodiments of the present invention will become apparent from the following detailed description, which, when taken in conjunction with the drawings, illustrate by way of example the principles of the invention.

DETAILED DESCRIPTION

Figure 1:
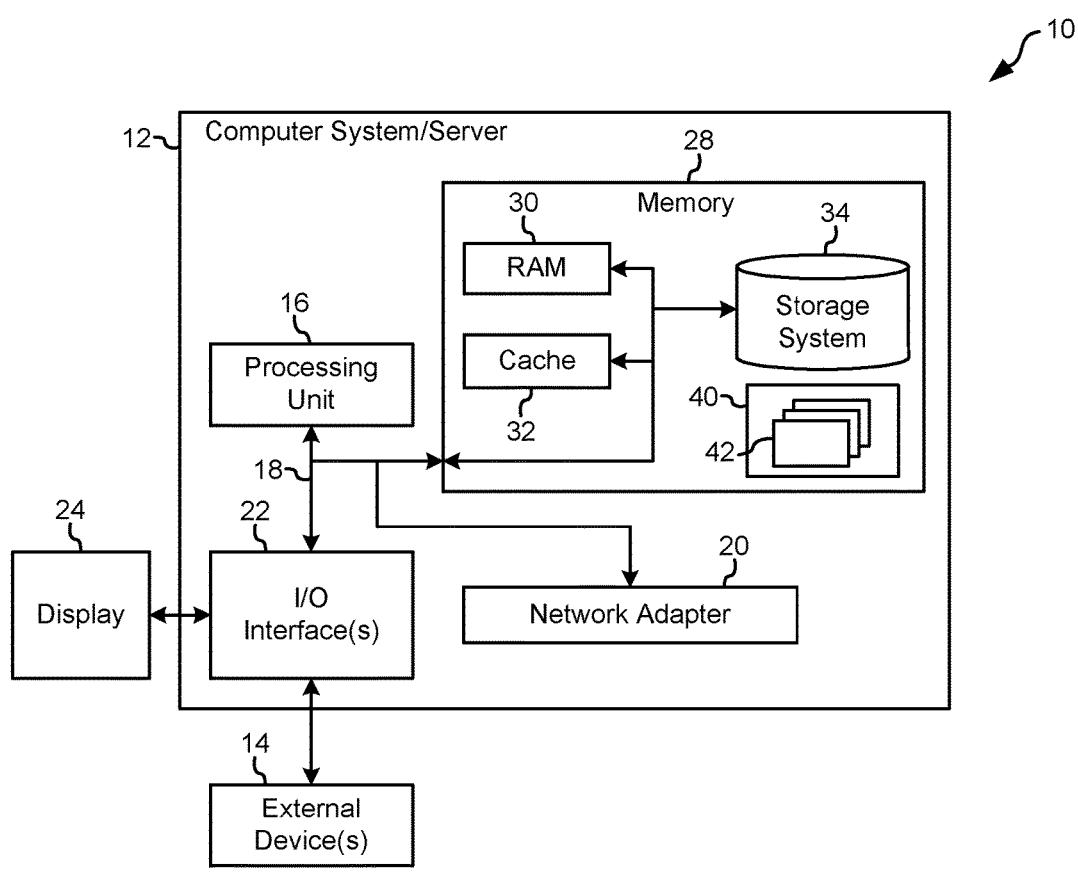
FIG. 1 is a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof for improved processes of determining the gain parameters that are used for adjusting the estimated energy values of periodic waveforms in an HD servo pattern. Accordingly, some of the embodiments described herein have successfully improved the achievable accuracy of detector characteristics, as will be described in further detail below.

In one general embodiment, a tape drive-implemented method includes: causing a servo reader to move laterally in a first direction over a high-density servo pattern on a moving magnetic tape, receiving a readback signal from the servo reader as the servo reader moves laterally in the first direction, using amplitudes of the readback signal to determine a maximum energy value of each of the at least two periodic waveforms, and using the maximum energy values to set a gain parameter for each of the respective periodic waveforms. The first direction is perpendicular to a longitudinal axis of the magnetic tape. Moreover, the high-density servo pattern includes a plurality of high-density servo tracks, the servo tracks including at least two patterns written at different frequencies to produce different periodic waveforms during readback.

In another general embodiment, a computer program product includes a computer readable storage medium having program instructions embodied therewith, the program instructions executable by a processor to cause the processor to: cause, by the processor, a servo reader to move laterally in a first direction over a high-density servo pattern on a moving magnetic tape, receive, by the processor, a readback signal from the servo reader as the servo reader moves laterally in the first direction, use, by the processor, amplitudes of the readback signal to determine a maximum energy value of each of the at least two periodic waveforms, and use, by the processor, the maximum energy values to set a gain parameter for each of the respective periodic waveforms. The first direction is perpendicular to a longitudinal axis of the magnetic tape. Moreover, the high-density servo pattern includes a plurality of high-density servo tracks, the servo tracks including at least two patterns written at different frequencies to produce different periodic waveforms during readback.

In yet another general embodiment, a tape drive includes: a controller comprising logic integrated with and/or executable by the controller to cause the controller to: cause a servo reader to move laterally in a first direction over a high-density servo pattern on a moving magnetic tape, receive a readback signal from the servo reader as the servo reader moves laterally in the first direction, use amplitudes of the readback signal to determine a maximum energy value of each of the at least two periodic waveforms, and use the maximum energy values to set a gain parameter for each of the respective periodic waveforms. The first direction is perpendicular to a longitudinal axis of the magnetic tape. Moreover, the high-density servo pattern includes a plurality of high-density servo tracks, the servo tracks including at least two patterns written at different frequencies to produce different periodic waveforms during readback.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth herein.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 which is coupled to processor 16.

Bus 18 represents one or more of any of several types of bus structures, including a memory bus or memory controller, a peripheral bus, an accelerated graphics port, a processor or local bus using any of a variety of bus architectures, etc. By way of example, which is in no way intended to limit the invention, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk (DVD)-ROM or other optical media may be provided. In such instances, each disk drive may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, program data, etc. Each of the operating system, one or more application programs, other program modules, and program data or some combination thereof, may include an implementation of a networking environment. It should also be noted that program modules 42 may be used to perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

Figure 2:
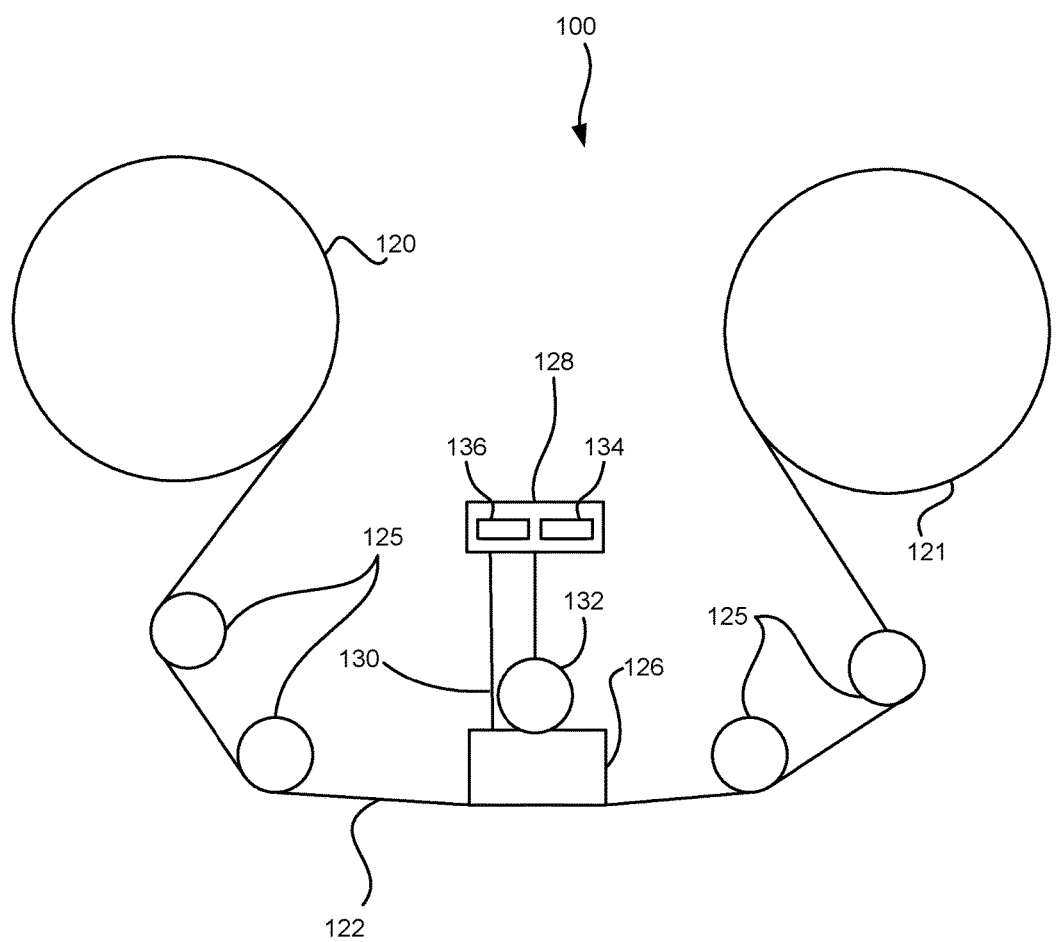
FIG. 2 is a simplified tape drive of a tape-based data storage system, according to one embodiment.

Looking to FIG. 2, a tape supply cartridge 120 and a take-up reel 121 are provided to support a tape 122. One or more of the reels may form part of a removable cartridge and are not necessarily part of the tape drive 100. A tape drive, e.g., such as that illustrated in FIG. 2, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein according to various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 3:
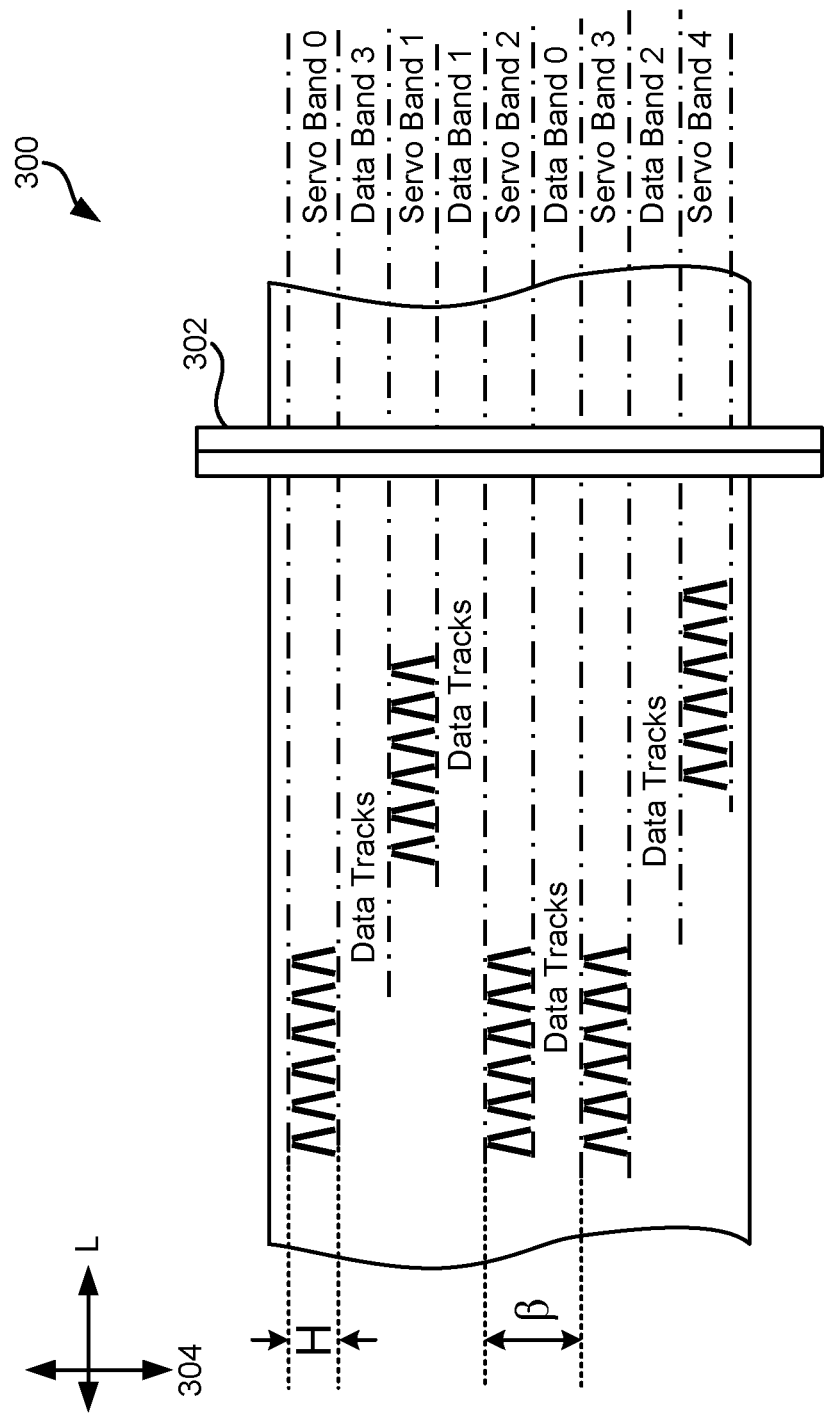
FIG. 3 is a tape layout, according to one embodiment.

Referring momentarily to FIG. 3, an illustrative tape layout is depicted in accordance with one embodiment. As shown, tape 300 has a tape layout which implements five servo bands (e.g., servo patterns) Servo Band 0-Servo Band 4, and four data bands Data Band 0-Data Band 3 located between pairs of servo bands, as specified in the LTO format and IBM Enterprise format. Data is recorded in the data bands. The height H of each of the servo bands is measured in the cross-track direction 304 which is about orthogonal to the length L of the tape 300. According to an example, the height H of each of the servo bands may be about 186 microns according to the format of LTO Generations 1 to 6. Moreover, a pitch β between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives are configured to operate at low tape velocities and/or with nanometer head position requirements. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 terabyte (TB) and beyond.

However, according to some embodiments, magnetic tape may further be augmented with additional features that provide additional functionality. Accordingly, HD servo patterns may be implemented in place of the standard TBS servo patterns, e.g., as seen in FIG. 3. The HD servo patterns may be used to improve track-following performance.

However, it may be desirable that TBS servo patterns (or at least substantial features from them) remain a part of magnetic tape formats. Thus, in still further embodiments, a standard TBS servo pattern (e.g., as shown in FIG. 3) may be implemented in combination with one or more HD servo patterns (e.g., see FIG. 4A below). One implementation includes a hybrid servo pattern scheme, in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

Figure 4A:
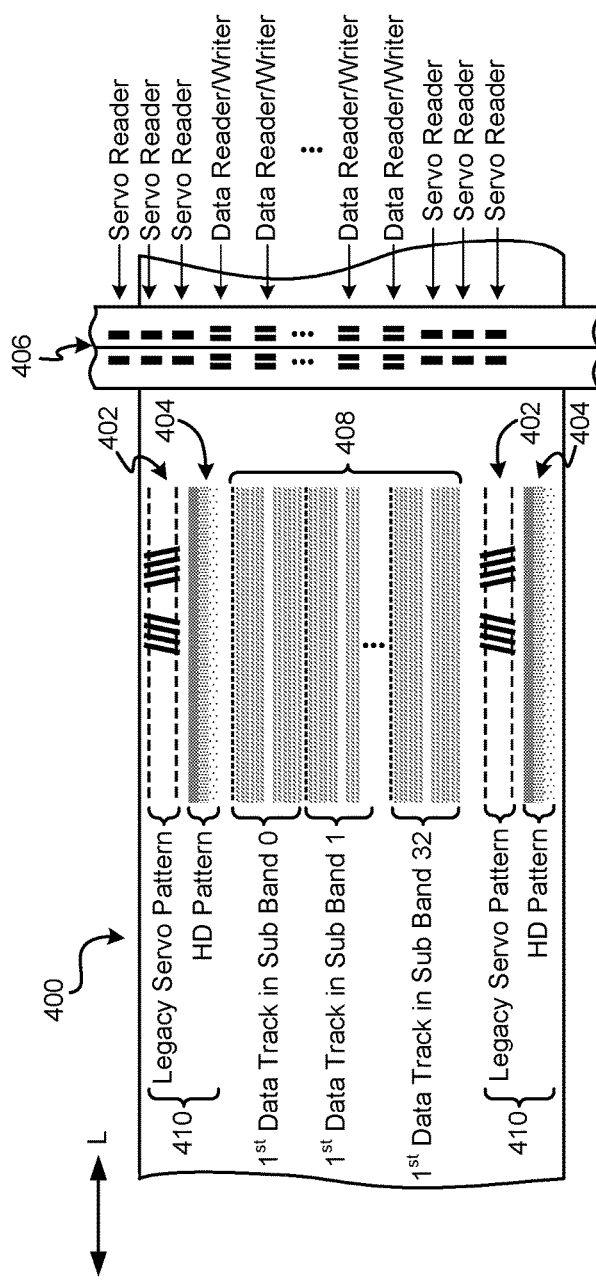
FIG. 4A is a hybrid servo pattern written in a dedicated area of a tape medium, according to one embodiment.
Figure 5C:
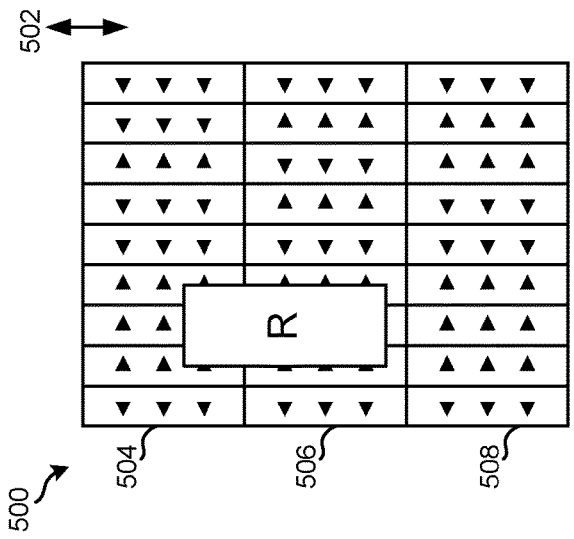
FIG. 5C is a representation of a reader over an HD pattern, according to one embodiment.
Figure 11A:
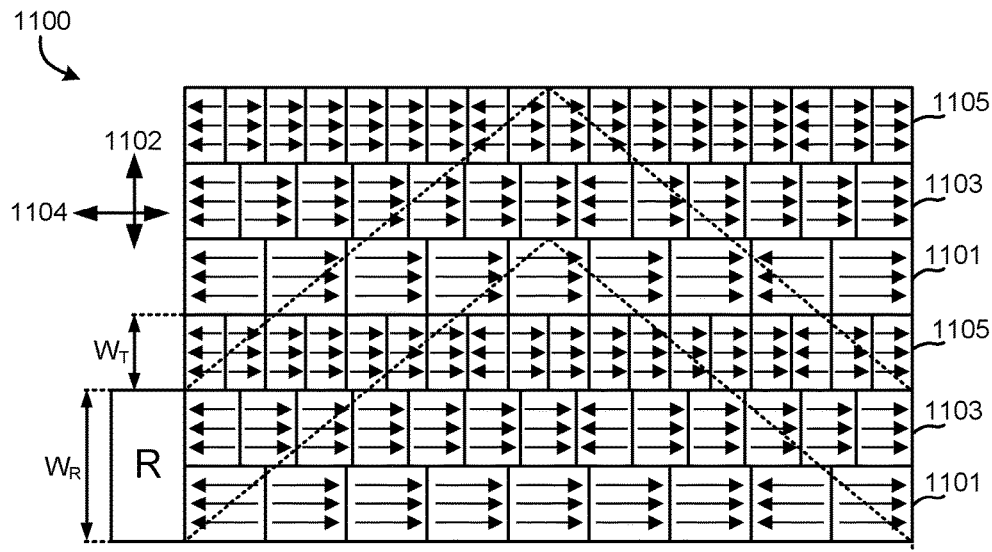
FIG. 11A is a representative view of the path of a servo reader across an HD servo pattern, according to one embodiment.

A hybrid servo pattern 410, which includes a standard TBS pattern 402 written in a servo band, as well as an HD pattern 404 that is written in a HD band (e.g., dedicated area) of the tape medium 408 is shown in FIG. 4A. Moreover, each HD pattern 404 includes a number of HD tracks, each of the HD tracks having a respective periodic waveform, e.g., as seen in FIGS. 5A, 5C and 11A below. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, LPOS, etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming an HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from an HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

Samples provided at the input of the components performing the spectral estimation may be obtained at the proper sampling instants by interpolating the sequence of readback HD servo signal samples from an analog-to-digital (A/D) converter at a fixed clock frequency in one embodiment, or at a variable clock frequency in another embodiment. The time base of the interpolator may be derived from the estimate of the tape velocity provided by the TBS channel operating in parallel with the HD detector, in some embodiments, as will be described in further detail below.

Various trade-offs between the rate of generation of spectral estimates, from which servo reader lateral position estimates are obtained, and the standard deviation of the estimation error are possible. However, a suitable and preferred implementation may be achieved with a significantly reduced complexity compared to DFT-based or FFT-based implementations. Specifically, in one embodiment, only a small set of spectral estimates are computed, compared to the fixed set of equally-spaced spectral components computed by a DFT or FFT.

Even when the HD servo pattern uses a large number of tone frequencies, the maximum number of spectral estimates that are computed by the proposed detector may correspond to the maximum number of tracks that an HD servo reader reads simultaneously at any time. Also, the proposed detector may be reconfigured to provide spectral estimates corresponding to the tracks currently being read based on the coarse positioning information from the TBS channel.

The tape layout 400 of FIG. 4A includes a hybrid servo pattern 410 according to one embodiment, in the hybrid servo pattern 410, an HD pattern 404 is written in a space adjacent to a standard TBS pattern 402. Three servo readers Servo Reader are assigned to each hybrid servo pattern 410 (e.g., servo band). According to the present embodiment, quadrature sequences are not included due to the use of the TBS pattern 402, which is converse to products implementing servo functionality in hard-disk drives.

Figure 4B:
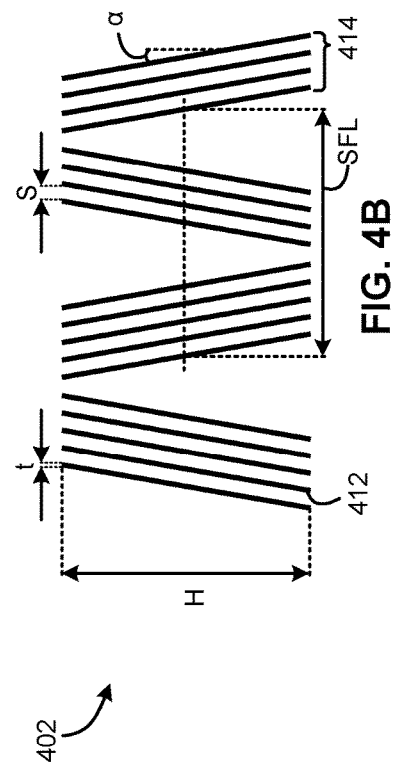
FIG. 4B is a partial detailed view of a TBS pattern, according to one embodiment.

Looking momentarily to FIG. 4B, a partial detailed view of a TBS pattern 402 (e.g., a TBS track) is illustrated according to an exemplary embodiment. As shown, a plurality of servo stripes 412 together form a servo burst 414, while corresponding pairs of servo bursts 414 form servo sub-frames. In the present embodiment, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle α. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 µm, and the angle α may be about 6°, while the thickness t is about 2.1 µm. Moreover, the spacing S between each of the servo stripes 412 and/or the sub-frame length SFL between servo bursts 414 having the same azimuthal slope may vary depending on the desired embodiment. According to an exemplary approach, which is in no way intended to limit the invention, the spacing S may be about 5 µm, while the sub-frame length SFL is about 100

μm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 of FIG. 4A may include periodic waveforms written on adjacent tracks along the length L of the tape. For example, the adjacent tracks may each have one of two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

An HD servo pattern in some approaches may be written in adjacent tracks, where the periodic waveform in each track has a different frequency than the adjacent track. In general, HD patterns may be interpreted as including periodic waveforms at "N" different frequencies $f_1, f_2, \ldots, f_N$. Accordingly, HD servo patterns may be able to desirably provide more accurate and/or more frequent estimates of servo channel parameters according to various embodiments described herein.

Looking to FIGS. 5A-5D, an HD pattern 500 is shown that overcomes the limited range of lateral head displacement associated with an HD pattern having only two periodic waveforms, characterized by two different spatial frequencies. As shown in FIGS. 5A and 5C, at least three frequencies are used for the HD pattern 500 in adjacent tracks, which repeat periodically along the band where the HD pattern is written. In the embodiment of FIGS. 5A and 5C, the servo reader (denoted by the block labelled 'R') spans wider in the cross-track direction 502 than a single track, such that at least two tones are detected under any reading conditions at a given time when the servo reader R is positioned over the HD pattern 500. Looking specifically to FIG. 5A, the reader R spans across both the bottom portion 508 and middle portion 506 of the HD pattern 500. FIG. 5C illustrates an alternative position for the servo reader R, where the reader R spans across the upper portion 504 and middle portion 506 of the HD pattern 500.

The three portions 508, 506, 504 of the periodic waveforms are characterized by three different frequencies $f_1$, $f_2$, and $f_3$, respectively, where, for example, $f_3 > f_2 > f_1$. According to various approaches, each waveform may be characterized as having a number of periods in a range from about 25 to about 200, such as 30 periods, 50 periods, 75 periods, 100 periods, etc., within a predetermined spacing. More preferably, the predetermined spacing may be in a range from about 50 μm to about 150 μm, such as about 60 μm, about 75 μm, about 100 μm, etc., depending on the approach. Moreover, the symbol length may be in a range from about 0.5 μm to about 3.0 μm, e.g., such as about 1.0 μm, about 1.5 μm, about 2.0 μm, etc.

Hence, with continued reference to FIGS. 5A-5D, an edge of one of the portions of the HD pattern 500 may be distinguished from the edge of another of the portions by evaluating the signals read by the servo reader R. Looking specifically to FIG. 5A, an edge of the middle portion 506 may be distinguished from an edge of the bottom portion 508 by evaluating the signals read by the servo reader R. The graph 510 in FIG. 5B identifies the various frequencies in the readback signal from servo reader R and the energy level corresponding to each of the respective frequencies. Energy values may be determined in some approaches by integrating over a given amount of time (or distance along the tape). As shown in graph 510, in addition to the middle frequency $f_2$, the bottom frequency $f_1$ is present in the readback signal of the servo reader R and may thereby be detected by a spectral analysis. According to some approaches, spectral analysis may be performed by an HD detector. Furthermore, the energy values of the spectral components $f_1$ and $f_2$ represent the relation of the servo reader R overlapping the middle and bottom portions 506, 508. Given that the energy value of the spectral component of frequency $f_1$ is smaller than the energy value of the spectral component of the second frequency $f_2$, it follows that the servo reader R is overlapped with the middle portion 506 more than it is overlapped with the bottom portion 508. Moreover, a comparison of the corresponding energies may be used to determine a fine position of the servo reader R with respect to a magnetic tape.

Figure 5D:
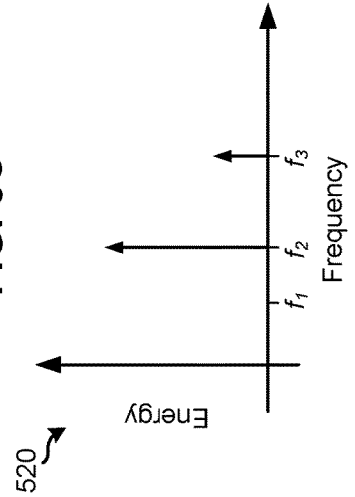
FIG. 5D is a graph plotting readback energy vs. frequency for the reader in FIG. 5C.
Figure 5A:
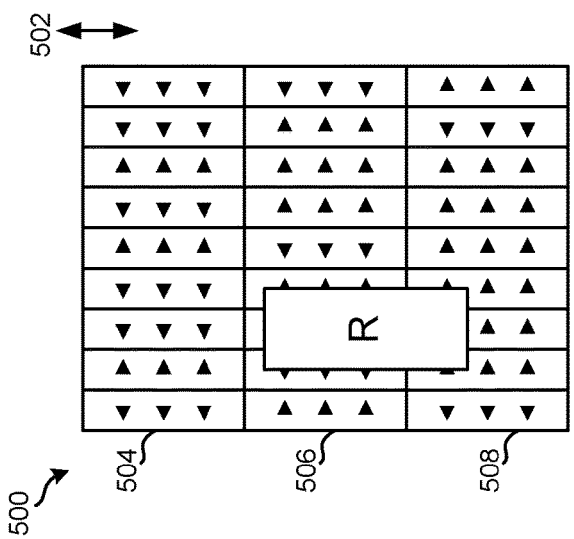
FIG. 5A is a representation of a reader over an HD pattern, according to one embodiment.
Figure 5B:
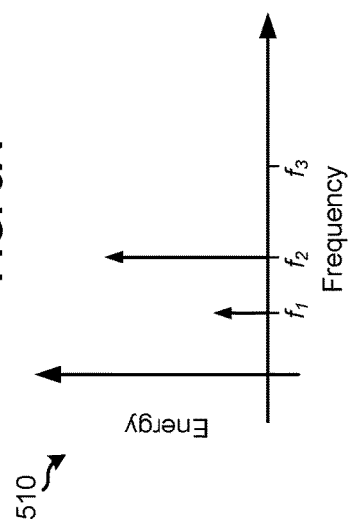
FIG. 5B is a graph plotting readback energy vs. frequency for the reader in FIG. 5A.

Similarly, the graph 520 in FIG. 5D identifies the frequencies in the readback signal from servo reader R positioned as shown in FIG. 5C, as well as the energy level corresponding to each of the respective frequencies. As shown, frequencies $f_2$, and $f_3$ are present in the readback signal of the servo reader R, and may be detected by a spectral analysis. Again, the energies of the spectral components for frequencies $f_2$, and $f_3$ represent that the servo reader R is positioned above the upper and middle portions 504, 506. Given that the energy of the spectral component of frequency $f_3$ is smaller than the energy of the spectral component of frequency $f_2$, it follows that the servo reader R is overlapped with the middle portion 506 more than it is overlapped with the upper portion 504. Moreover, the comparison of the corresponding energy values may be used to determine a fine position of the servo reader R with respect to a magnetic tape.

The energies of the spectral components for frequencies in an HD servo pattern may further be used to determine gain parameters which may be used to improve detector characteristics, as will be described in further detail below.

Note that the waveform periods of the three frequencies may be integer multiples of a period T, for example T=241.3 nm, which corresponds to the highest spatial frequency, which is proportional to 1/T, when spectral estimation by a DFT/FFT-based detector with a minimum number of spectral bins for given integration interval is adopted.

Figure 6:
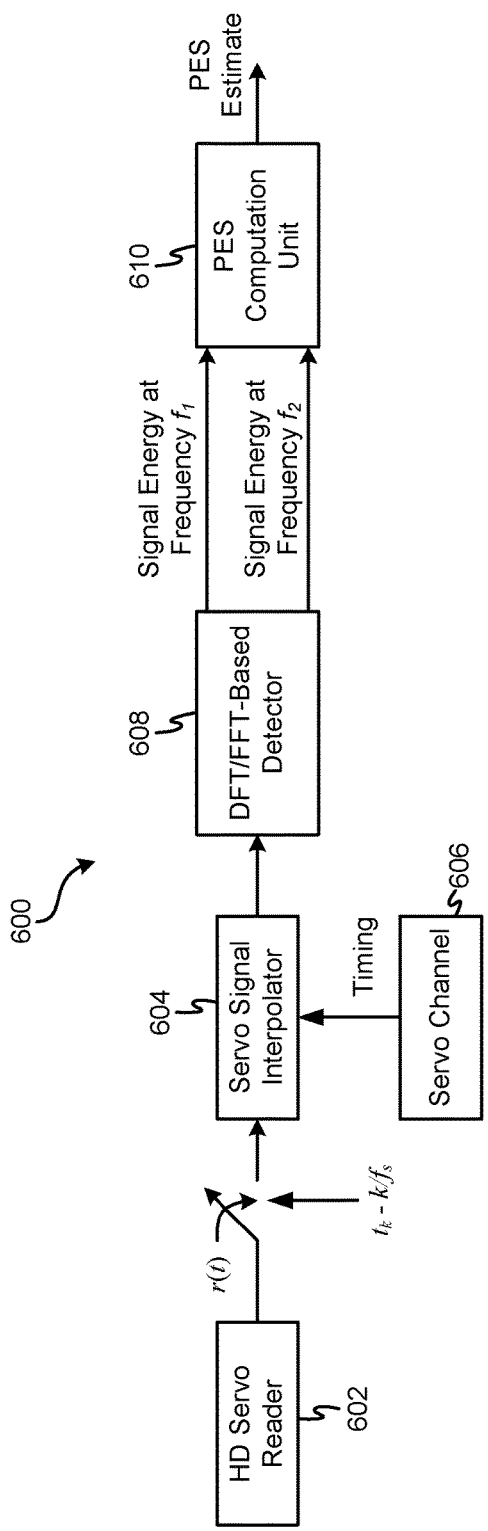
FIG. 6 is a block diagram of a detector for HD patterns, according to one embodiment.

FIG. 6 shows a block diagram of a DFT/FFT-based detector 600 configured for the computation of the PES from an HD servo pattern comprising periodic waveforms. The servo signal from the servo reader 602 is interpolated using a servo signal interpolator 604 with the timing information from a synchronous TBS servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are input to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback, as the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

Figure 7:
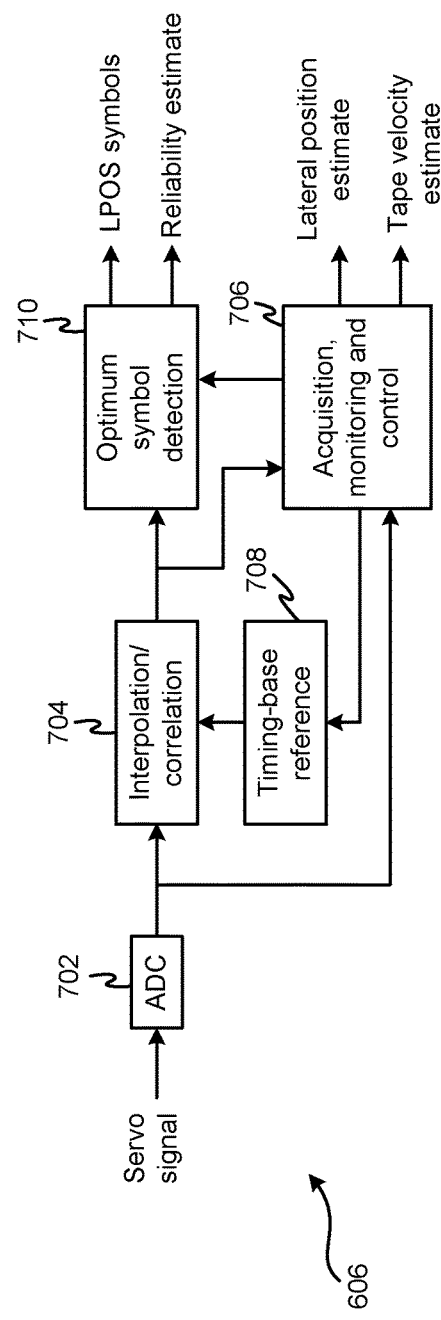
FIG. 7 is a partial block diagram of a servo channel for the detection of TBS patterns, according to one embodiment.

Referring momentarily to FIG. 7, a servo channel 606 to extract servo information from TBS signals is illustrated according to an exemplary embodiment which is in no way intended to limit the invention. As shown, a servo signal is input to an analog-to-digital converter (ADC) 702 of the TBS servo channel 606, which may in turn be provided to an interpolation/correlation module 704 and/or an acquisition, monitoring and control module 706. Moreover, an output from the timing-base reference 708 is also provided to the interpolation/correlation module 704. Acquisition, monitoring and control module 706 may output a lateral position estimate and/or a tape velocity estimate which may be further used, e.g., according to any of the approaches described herein. Furthermore, Optimum signal detection module 710 may output LPOS symbols and/or a reliability estimate as shown.

Servo channel 606 may operate at a specific clock rate at which it samples the readback signal of a corresponding tape head. However, a processor which implements a controller capable of performing any one or more of the operations described below (e.g., with respect to methods 900, 1200, 1300), may operate at a different clock rate.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 8:
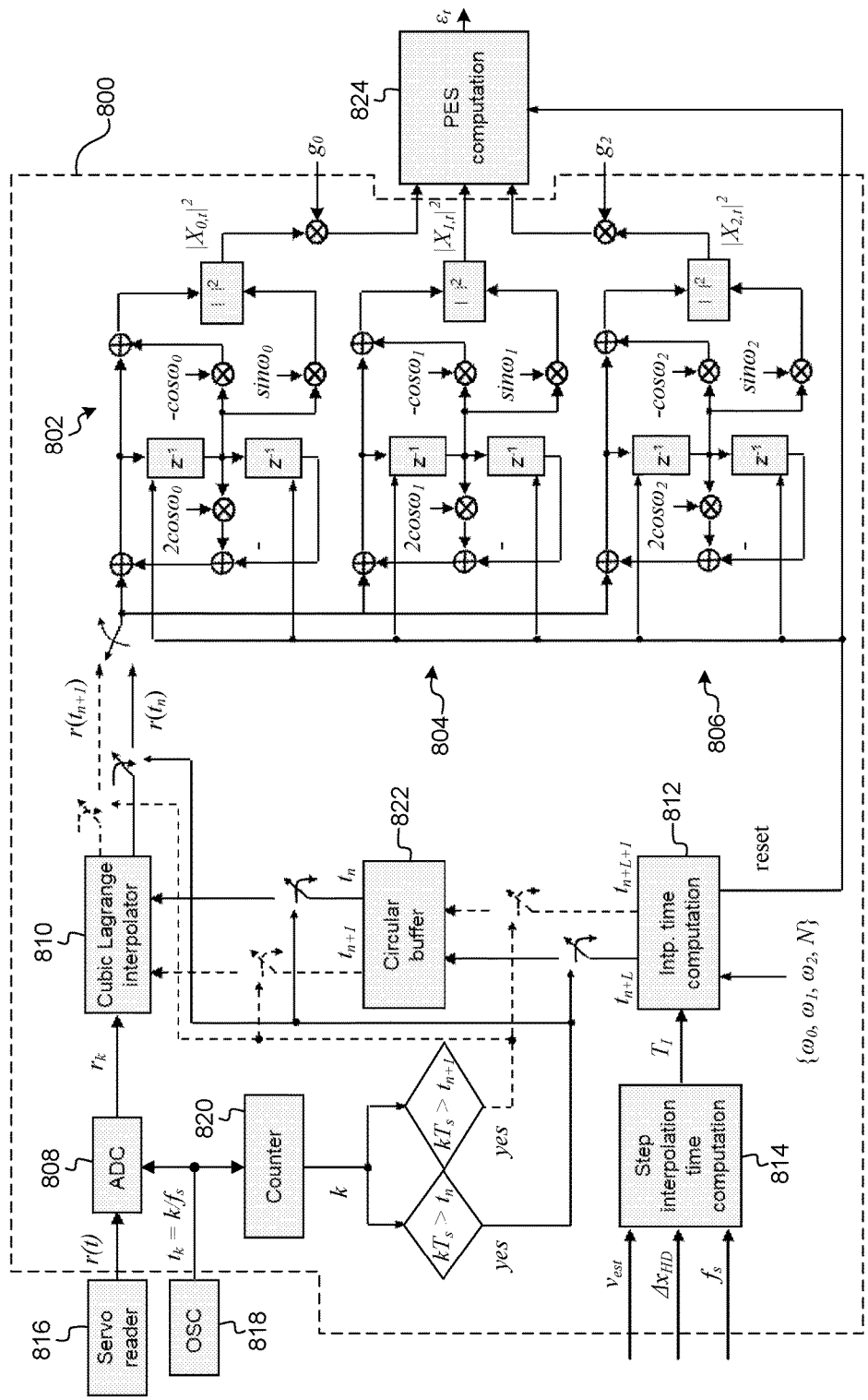
FIG. 8 is a block diagram of a detector for HD patterns, according to one embodiment.

Now looking to FIG. 8, a detector 800 for HD patterns is shown according to one embodiment. The detector 800 is configured to operate with periodic waveforms, which correspond to the components of the readback signal of an HD pattern, that are characterized by three frequencies at any time, as illustrated for example in FIGS. 5A-5D according to one embodiment. With continued reference to FIG. 8, the detector 800 includes three digital filters 802, 804, 806 with low implementation complexity, each digital filter comprising a second-order infinite impulse response (IIR) stage followed by a two-tap finite impulse response (FIR) stage, for the estimation of the energy of the readback HD servo signal at a specific frequency according to the Goertzel algorithm. Other arrangements and components may be used for the three digital filters 802, 804, 806 as would be understood by one of skill in the art upon reading the present descriptions. The waveform periods (in nm) corresponding to the three frequencies may be assumed to be integer multiples of a fundamental period, T.

For an accurate estimation of the energies of the three periodic waveform components in a finite integration interval, the frequencies of the periodic waveform components preferably match the characteristic frequencies of the three digital filters 802, 804, 806, denoted by $\omega_0/2\pi$, $\omega_1/2\pi$, and $\omega_2/2\pi$, respectively. When a match is not possible, it is preferred that the frequencies are within about 0.001% to 1.0% of the frequencies set for the three digital filters 802, 804, 806, and more preferably a difference of less than about 0.1%. This may be achieved by resampling the output sequence of the ADC 808 at appropriate time instants, which may be provided by an interpolator 810, with a time base obtained from the tape velocity and a given interpolation distance $\Delta x_{HD}$, as shown in FIG. 8. The frequency fs of the clock 818, is used as an input to the ADC 808, the counter 820, and the digital circuitry of the detector 800. Moreover, the frequency fs of the clock 818 may be either a fixed frequency or a variable frequency.

In one embodiment, the interpolator 810 may be a cubic Lagrange interpolator to achieve smaller signal distortion than a linear interpolator. Of course, any suitable interpolator may be used, as would be understood by one of skill in the art. The output signal samples of the interpolator 810 are obtained that correspond with HD servo signal samples taken at points on the tape that are separated by a step interpolation distance equal to $\Delta x_{HD}$, independently of the tape velocity. $\Delta x_{HD}$ is preferably selected such that the condition $T/\Delta x_{HD}=K$ is satisfied, where K is a positive integer number. The time base for the generation of the interpolator output samples may be provided by an interpolation time computation unit 812, which yields the sequence of time instants $\{t_n\}$, at which the resampling of the ADC output sequence takes place. Time instants $\{t_n\}$ may furthermore be provided to circular buffer 822.

The detector 800 illustrated in FIG. 8 may be configured such that a given number of samples is computed by the interpolator 810 within a clock interval $T_s=1/f_s$. However, doing so may set a limit on the maximum tape velocity at which the detector 800 may operate, the maximum tape velocity represented by $2\Delta x_{HD}/T_s$. The maximum tape velocity supported by the detector 800 may be increased by allowing a larger number of samples to be computed by the interpolator 810 within a single clock interval, but doing so also increases computational complexity.

For a fixed tape velocity, the time instants $\{t_n\}$ may be uniformly spaced by $T_1$ seconds, where $T_1$ denotes the time interval that it takes for the tape to travel over a distance equal to the step interpolation distance $\Delta x_{HD}$. The estimation of the time interval $T_1$ is performed by a step interpolation time computation unit 814, which computes $T_1=\Delta x_{HD}/v_{est}$, i.e., the ratio between $\Delta x_{HD}$ and the estimate of the instantaneous tape velocity $v_{est}$, which may be obtained from the TBS channel in one approach. The TBS channel may operate as a synchronous TBS channel according to one embodiment. The average number of interpolated signal samples generated per ADC clock interval is given by the ratio $T_s/T_1$, where $T_s=1/f_s$ denotes the clock interval. The ADC clock frequency, $f_s$, may be a fixed frequency in one approach, or a variable frequency in another approach.

In one embodiment, the HD detector 800 may be configured to estimate the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

Referring still to FIG. 8, in another embodiment, the HD detector 800 may be configured to compute a head lateral position estimate for coarse positioning of the servo reader based on an output of a TBS channel of the tape drive. Also, the HD detector 800 may be configured to adjust settings for at least one digital filter according to waveform frequency components of the HD servo signal estimated based on the head lateral position estimate. For example, the setting $\omega_i$ of the i-th digital filter may be adjusted based on the coarse position estimate and the known frequency $\omega_i=2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 800 receives, as inputs, values of the three characteristic frequencies $\{\omega_0, \omega_1, \omega_2\}$, with $\omega_i=2\pi f_i$ from which the coefficients of the digital filters 802, 804,

806 are obtained. These frequencies may be obtained from the knowledge of the servo reader lateral position provided by the TBS channel in one embodiment, as described above. Assuming the number "Q" represents the number of samples over which the estimates of the energies of the periodic waveforms are computed, Q may determine the length of the integration interval, and therefore may also determine the spatial frequency resolution. Assuming the value of Q is even, Q/2 represents the number of frequencies for which energy estimates would be provided by a DFT/FFT-based HD detector that operates over Q samples. Q may be obtained from the tape drive memory in one embodiment. Moreover, Q is typically about 100 or larger.

In another embodiment, the HD detector 800 may be implemented without an interpolator 810, but with digital filters configurable to adjust their settings according to the waveform spatial frequency components of the HD servo signal read from the magnetic tape medium and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 816. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_t$ of the excess digital filter such that it measures a spectral component at a frequency that is not used by the HD patterns.

A lateral position estimate of the HD servo reader 816, and hence a position error signal from the knowledge of the target head position, may be obtained by a linear combination of the three energy estimates. Note that the maximum number of spectral estimates that are computed at any time is determined by the maximum number of tracks that may be read by the HD servo reader 816, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 800 may be derived from knowledge of the lateral position estimate obtained from the TBS channel. Other components of the HD detector 800 may operate as would be known to one of skill in the art, and are omitted here for the sake of clarity of the described embodiments.

Although an HD servo detector may derive a lateral position of the head by comparing the energies from the different frequencies in the readback signal from the HD servo pattern, when an HD servo pattern is recorded with tracks having different frequencies, if the tracks also have the same width, the total energy measured from the readback signal will be different. This is because the magnetic recording channel produces a higher readback signal energy from tracks written at lower frequencies and a smaller energy from tracks written at higher frequencies, for the parameters that are typically used for writing HD patterns. To account for this difference in readback energy values, the energy estimates may be further multiplied by gain factors to compensate for the different attenuations that the readback HD servo signal may experience at different frequencies. As shown, the outputs $|X_{i,t}|^2$ from the three digital filters 802, 804, 806 are multiplied by gain factors $g_i$, for i=0, 1, 2 before being provided to a PES computation unit 824, which provides a position error estimate ($\varepsilon_t$) at given time t. The PES computation unit 824 determines a PES estimate by taking the difference of the signal energy values. Thus, if the estimates of the waveform energies are not normalized, the different characteristics of the periodic waveforms at different frequencies may lead to undesirable detector characteristics. In sharp contrast, by determining and applying accurate gain parameters, some of the embodiments described herein are able to significantly improve detector characteristics.

As previously mentioned, the energies of the spectral components for frequencies in an HD servo pattern may be used to determine the gain parameters applied in a given situation. An HD servo pattern preferably includes longitudinally written tracks each having a periodic waveform of a particular frequency, where the frequencies differ from track to track. In general, HD patterns may be interpreted as including periodic waveforms at "N" different frequencies $f_1, f_2, \ldots, f_N$. Moreover, according to an illustrative approach, the "N" different frequencies may be characterized by magnetic imprints of width $2*trD_n$ on alternating current (AC)-erased perpendicular media with symbol length $L_n$. Accordingly, HD servo patterns may be able to desirably provide more accurate and/or more frequent estimates of servo channel parameters, as would be appreciated by one skilled in the art after reading the present description.

The HD detector 800 may be used to estimate the energy of the periodic waveforms at the different frequencies $f_1, f_2, \ldots, f_N$. Moreover, "W" periodic waveforms may be written for each frequency, for a total of N×W written tracks in an HD pattern. Thus, proper choices of the gain parameters $g_i$, i=1, ..., N, are again desired in order to compensate for different waveform characteristics and/or obtain desirable detector characteristics.

Figure 9A:
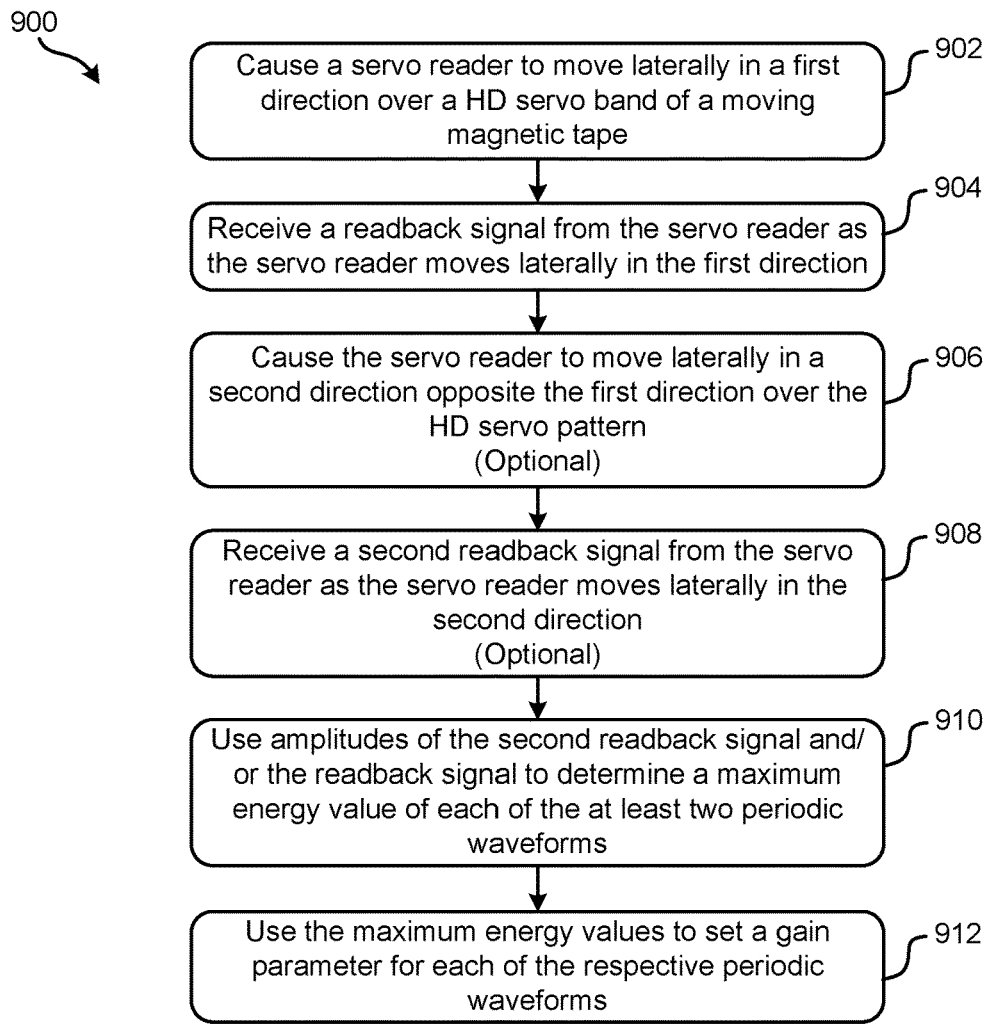
FIG. 9A is a flowchart of a method, according to one embodiment.

Looking to FIG. 9A a flowchart of a method 900 for determining the gain parameters used for adjusting the estimated energy values of periodic waveforms in an HD servo pattern is shown according to one embodiment. The method 900 may be performed in accordance with the present invention in any of the environments depicted in FIGS. 1-8, among others, in various embodiments. For example, in some approaches one or more of the operations in method 900 may be performed (e.g., implemented) by a tape drive, e.g., as seen in FIG. 2. Of course, more or less operations than those specifically described in FIG. 9A may be included in method 900, as would be understood by one of skill in the art upon reading the present descriptions.

Each of the steps of the method 900 may be performed by any suitable component of the operating environment. For example, in various embodiments, the method 900 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9A, operation 902 of method 900 includes causing a servo reader to move laterally in a first direction over an HD servo band of a moving magnetic tape. According to the present description, the "first direction" is in the cross-track direction which is perpendicular to a longitudinal axis of the magnetic tape. Moreover, causing the servo reader to move laterally in the first direction may include sending instructions to an actuator to cause the lateral motion of the servo reader.

Figure 10:
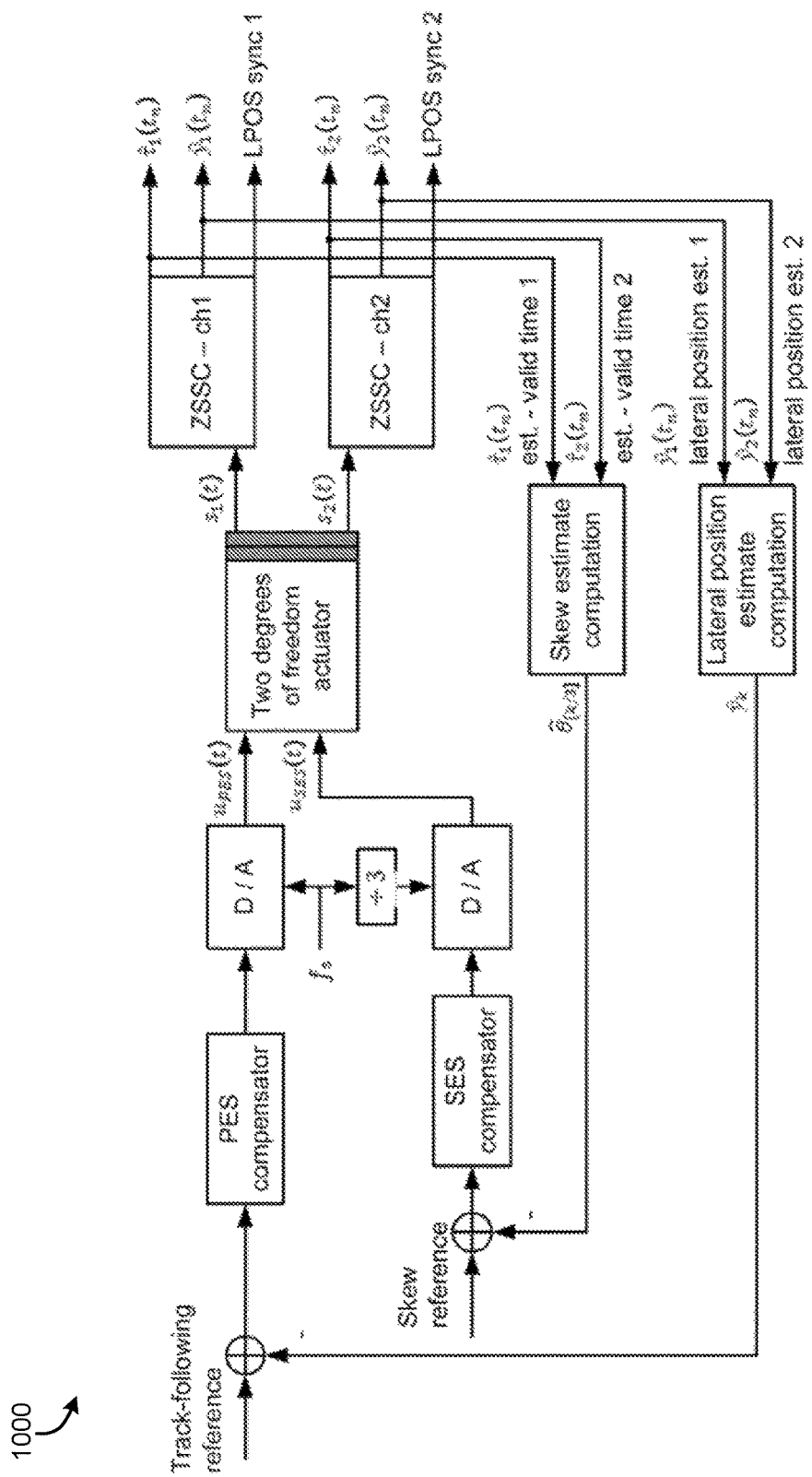
FIG. 10 is a block diagram of track-following and skew-compensation loops using dual synchronous servo channels, according to one embodiment.

According to an exemplary embodiment, which is in no way intended to limit the invention, causing the servo reader to move laterally in the first direction, and/or a direction antiparallel thereto, may be performed in a closed loop by applying a slowly varying reference waveform to the track-following loop. Furthermore, a lateral position estimate provided by a TBS servo channel may be used as feedback information. Referring momentarily to FIG. 10, a block diagram 1000 of track-following and skew-compensation loops operating with servo information extracted from a TBS pattern is illustrated in accordance with one embodiment. It follows that any one or more of the components included in block diagram 1000 may be used to cause the servo reader to move laterally in a first direction (and/or a direction antiparallel thereto) over the HD servo band on the moving magnetic tape, e.g., as would be appreciated by one skilled in the art after reading the present description. Moreover, the system represented by block diagram 1000 may implement dual synchronous servo channels, according to some approaches.

Referring again to FIG. 9A, operation 904 of method 900 includes receiving a readback signal from the servo reader as the servo reader moves laterally in the first direction. As described above (e.g., with reference to FIGS. 5A-5D), an HD servo pattern may include a plurality of HD servo tracks. Moreover, each of the HD servo tracks may include at least two patterns written at different frequencies to produce different periodic waveforms during readback. Thus, the readback signal received may be processed to derive the different periodic waveforms included therein and the varying energy levels associated therewith. As a result, the difference in the energy levels of the different periodic waveforms may be used to determine a respective gain parameter, as will soon become apparent.

Optional operation 906 of method 900 further includes causing the servo reader to move laterally in a second direction opposite (antiparallel to) the first direction over the HD servo pattern. Moreover, optional operation 908 includes receiving a second readback signal from the servo reader as the servo reader moves laterally in the second direction. Operations 906 and 908 are optional in the sense that a second readback signal may not be needed in order to perform the remaining operations included in FIG. 9A. Rather, the readback signal received from a servo reader as it moves laterally across an HD servo pattern in one direction may be sufficient. Moreover, optional operation 906 and/or optional operation 908 may be performed according to any of the approaches described above with reference to operation 902 and 904 respectively.

Method 900 further includes using amplitudes of the second readback signal and/or the readback signal to determine a maximum energy value of each of the at least two periodic waveforms. See operation 910. According to some approaches which are in no way intended to limit the invention, the maximum energy of each periodic waveform may be determined if two conditions have been met.

The first condition is that the width of the servo reader measured in the cross-track direction is greater than a width of each of the HD servo tracks. Preferably, the width of the servo reader is greater than 1.5 times the width of at least one of the HD servo tracks. In other approaches, the width of the servo reader is greater than 2 times the width of at least one of the HD servo tracks. Referring momentarily back to the embodiment of FIGS. 5A and 5C, the servo reader (denoted by the block labelled 'R') spans wider in the cross-track direction 502 than the width of a single track, such that at least two tones are detected under any reading conditions at a given time when the servo reader R is positioned over the HD pattern 500. Looking specifically to FIG. 5A, the reader R spans across both the bottom portion 508 and middle portion 506 of the HD pattern 500. FIG. 5C illustrates an alternative position for the servo reader R, where the reader R spans across the upper portion 504 and middle portion 506 of the HD pattern 500.

Referring again to method 900 of FIG. 9A, the second condition is that the lateral motion of the servo reader is sufficiently slow to be able to identify and measure the maximum energy level of each of the at least two periodic waveforms. This condition may be met in existing tape drives, even when the track-following servo control loop is inactive. When the track-following servo control loop is inactive, tape will typically exhibit slow lateral tape motion (LTM) during tape transport operations. The slow LTM may be exploited to estimate the energy levels of the periodic waveforms. For embodiments implementing active track-following servo control, the LTM may be actively compensated for, and any type of additional slow lateral movement of the servo reader relative to tape may be achieved with active control, as would be appreciated by one skilled in the art after reading the present description.

Once equipped with the maximum energy value of each of the at least two periodic waveforms, method 900 further includes using the maximum energy values to set a gain parameter for each of the respective periodic waveforms. See operation 912.

It should be noted that any one or more of the operations included in method 900 may be performed at a time when calibration of the gain parameters for a set of tape cartridges having the same HD servo pattern is performed. The gain parameters may thereby be stored in (coded into) memory of each of the tape cartridges. However, any one or more of the operations included in method 900 may additionally or alternatively be performed each time a tape cartridge is loaded into a tape drive, during drive operation due to reader element wear, periodically after an amount of time, etc.

Figure 9B:
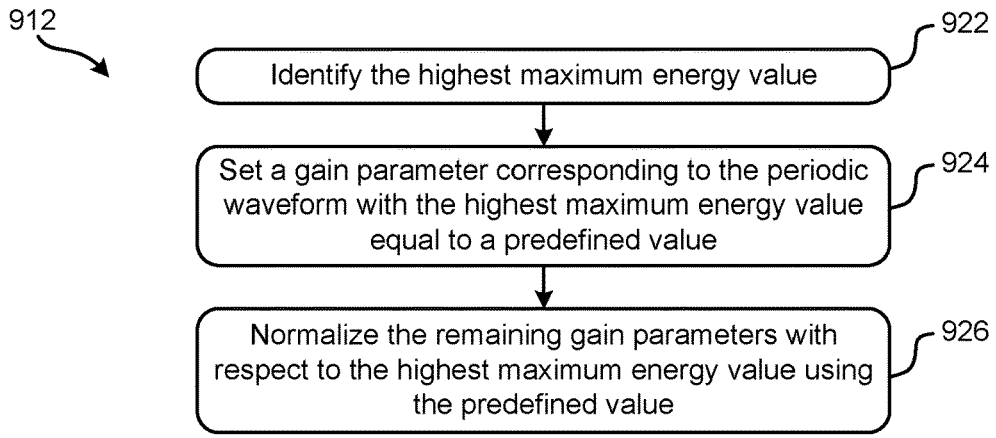
FIG. 9B is a flowchart of sub-operations for the method of FIG. 9A, according to one embodiment.

Looking now to FIG. 9B, exemplary sub-operations of using the maximum energy values to set a gain parameter for each of the respective periodic waveforms are illustrated in accordance with one embodiment, one or more of which may be used to perform operation 912 of FIG. 9A. However, it should be noted that the sub-operations of FIG. 9B are illustrated in accordance with one embodiment which is in no way intended to limit the invention.

As shown, using the maximum energy values to set a gain parameter for each of the respective periodic waveforms includes identifying the highest maximum energy value of the respective periodic waveforms. See sub-operation 922. Once the highest maximum energy value has been identified, the gain parameters may be normalized based on the highest maximum energy value. To normalize the gain parameters, sub-operation 924 first includes setting a gain parameter corresponding to the periodic waveform with the highest maximum energy value equal to a predefined value (e.g., a value of 1). Moreover, the remaining gain parameters are normalized with respect to the highest maximum energy value using the predefined value. See sub-operation 926.

According to preferred approaches, the remaining gain parameters may be set such that the product of each gain parameter multiplied by a corresponding maximum energy value is normalized. According to an illustrative approach, which is in no way intended to limit the invention, the gain parameter for the channel corresponding to the periodic waveform with highest energy, $\hat{E}_k$, is set equal to 1, while the remaining gain parameters are set equal to $\hat{E}_k/\hat{E}_j$, i=1, . . . , N, i≠k. In other words, the gain parameters are preferably set such that when multiplied with a corresponding energy value, the resulting product is a normalized value. As a result, preferred approaches included herein are able to determine gain parameters used to adjust (prior to PES computation) the estimated energy values of periodic waveforms in an HD servo pattern.

Looking to FIGS. 11A-11D, one or more of the operations included in FIGS. 9A-9B are shown as being implemented on an HD servo pattern 1100 in accordance with an exemplary embodiment, which is in no way intended to limit the invention. The HD servo pattern 1100 in FIG. 11A includes a plurality of HD servo tracks 1101, 1103, 1105, where adjacent HD servo tracks 1101, 1103, 1105 may each correspond to a different frequency as denoted by the different arrow lengths included therein. However, the frequency of some of the HD servo tracks 1101, 1103, 1105 may be about the same. According to the present embodiment, HD servo track pair 1101 has an about equal frequency, as do HD servo track pair 1103 and HD servo track pair 1105. Different HD servo tracks may have a different energy associated therewith than an immediately adjacent HD servo track. For example, HD servo track 1101 has a different energy associated therewith than an energy associated with HD servo track 1103 because the two HD servo tracks are written at different frequencies. However, HD servo tracks written at about the same frequency may have an energy associated therewith that is about the same. For example, each of the HD servo tracks in pair 1105 may have a respective energy value associated therewith such that the energy values are about equal.

Referring still to FIG. 11A, the servo reader (denoted by "R") is first caused to move in a first direction along the cross-track direction 1102. The distance that the servo reader R is caused to move in the first direction may vary depending on the number of HD servo tracks and/or the number of signals having different frequencies included therein. Afterward, the servo reader R is caused to move in a second direction along the cross-track direction 1102, the second direction being opposite (antiparallel) the first direction. The distance that the servo reader R is caused to move in the second direction may be about equal to the distance the distance the servo reader R was caused to move in the first direction. By causing the servo reader R to move in the first and second directions while the tape on which the HD servo pattern 1100 is positioned is traveling along the intended direction of tape travel 1104, the path of motion of the servo reader R along the length of the HD servo pattern 1100 has a "V" shape (e.g., a triangular trajectory) as represented by the dashed lines. Moreover, it should be noted that the width of the servo reader $W_R$ is twice as wide as a width $W_T$ of one of the HD servo tracks.

Figure 11B:
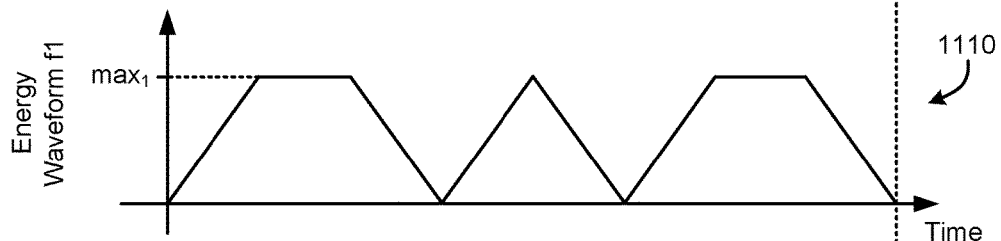
FIG. 11B is a graph plotting time vs. the energy waveform for a first frequency of the HD servo pattern of FIG. 11A.
Figure 11C:
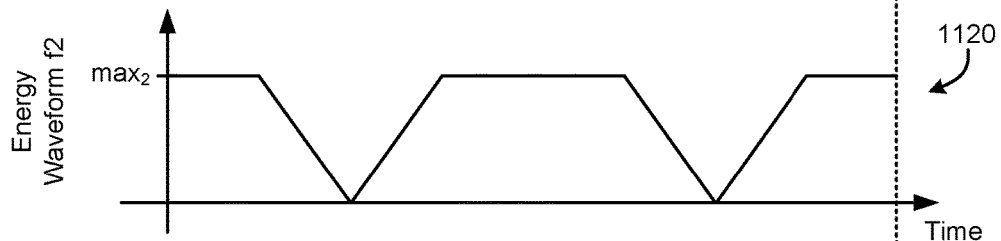
FIG. 11C is a graph plotting time vs. the energy waveform for a second frequency of the HD servo pattern of FIG. 11A.
Figure 11D:
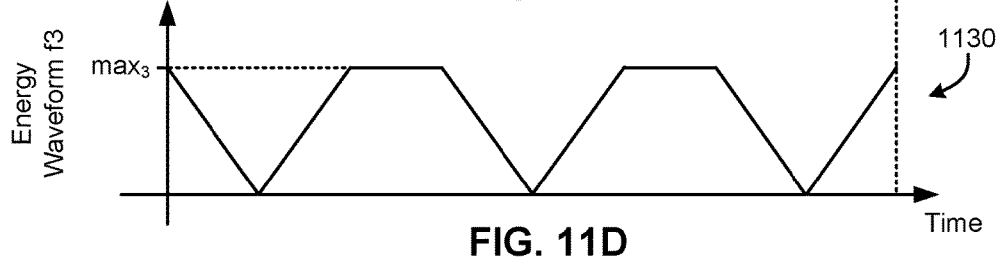
FIG. 11D is a graph plotting time vs. the energy waveform for a third frequency of the HD servo pattern of FIG. 11A.

Looking to graphs 1110, 1120, 1130 of FIGS. 11B-11D respectively, the plots included therein represent the waveforms which correspond to the three energy estimates obtained at the output of an HD detector by applying the triangular trajectory shown in FIG. 11A. As mentioned above, the lateral motion of the servo reader R is preferably sufficiently slow such that the maximum energy level of each of the at least two periodic waveforms may be identified and measured. By moving an HD servo reader laterally up and down across the HD servo pattern by an amount that spans the HD pattern width, the amplitude of the readback signal may be used to derive an estimate of the maximum value of the energy of each of the NW periodic waveforms written at the N different frequencies, $E_i$, i=1, . . . , NW. The energy values $\hat{E}_j$, j=1, . . . , N, used to set the gain parameter for the periodic waveforms at the N frequencies may then be obtained by averaging the maximum energy values that have been estimated for the waveforms at frequency $f_j$, j=1, . . . , N.

As mentioned above, according to some approaches the patterns written in more than one HD servo track may have a same frequency. Referring momentarily to FIG. 11A, "duplicate" HD servo tracks written at a same frequency are labeled in pairs 1101, 1103, 1105 and shown as having arrows of about the same length. Thus, according to an example, a HD servo pattern may include a first HD servo track having a pattern written at a same frequency as the frequency of a pattern included in a second HD servo track. As a result, the same frequency associated with the first and second HD servo tracks may also produce a same periodic waveform during readback of each of the first and second HD servo tracks. In such approaches, it is preferred that using the maximum energy values to set a gain parameter for the first and second HD servo tracks (e.g., see operation 910 above) includes averaging the maximum energy value corresponding to the first HD servo track with the maximum energy value corresponding to the second HD servo track. Furthermore, the average maximum energy value may then be used to set the gain parameter for the periodic waveform of the first and second HD servo tracks, e.g., according to any of the approaches described herein.

Looking again to graphs 1110, 1120, 1130 of FIGS. 11B-11D respectively, energy estimates as a function of time during calibration of gain parameters with a respect to three different frequencies from the readback signal of an HD pattern are shown. The energy estimates assume values close to the maximum over an extended time interval, which enables a reliable estimation of the maximum energy values for each of the periodic waveforms. Accordingly, the maximum energy value for each of the periodic waveforms at the given frequency corresponds to when the servo reader R fully overlaps a respective one of the HD servo tracks. Each of these instances is represented by the "plateaus" (maximum value) in each of the plots of graphs 1110, 1120, 1130. Moreover, implementing proper gain parameters may cause the energy values at each of the plateaus for each of the plots to be equal, thereby desirably normalizing the outputs.

In order to determine the proper gain parameters, the gain parameter for the channel corresponding to the periodic waveform with highest energy, $\hat{E}_k$, may be set equal to 1, while the remaining gain parameters may be set equal to $\hat{E}_k/\hat{E}_j$, i=1, . . . , N, i≠k. In some approaches, the energy values for the periodic waveforms at a given frequency cannot be assumed equal, e.g., because of different HD servo track widths. In such approaches, the gain parameters may be set by using the individual estimates for each of the HD servo tracks, rather than using the average values thereof.

According to another illustrative embodiment, which is in no way intended to limit the invention, a system may be dynamically reconfigured such that only those spectral estimates that correspond to the periodic waveforms currently being read, are computed. This type of embodiment may desirably be implemented in situations for which the number of tone frequencies is greater than or equal to three, yet the width of the servo reader is such that it cannot read all the HD servo tracks simultaneously. The estimates of the maximum energy values of the periodic waveforms at the N different frequencies, $\hat{E}_i$, i=1, . . . , N, may initially be obtained as described according to any of the approaches described herein. However, the system may be dynamically reconfigured so that an HD detector (e.g., see 800 of FIG. 8) computes only those spectral estimates that correspond to the periodic waveforms currently being read, as the maximum number of gain parameters provided to an HD detector preferably corresponds to the maximum number of tracks that an HD servo reader reads simultaneously at any given time. In this case, the gain parameters may also be dynamically reconfigured by setting the gain parameter for the channel corresponding to the periodic waveform with the highest energy being read ($E'_j$) equal to 1, and normalizing the remaining gain parameters with respect to $\hat{E}'_j$. Furthermore, the path of the HD servo reader over an HD servo pattern may be different from a triangular shape as seen in FIG. 11A, and approximate a sine-like wave plot in some approaches, or a pseudorandom manner in other approaches.

Figure 12:
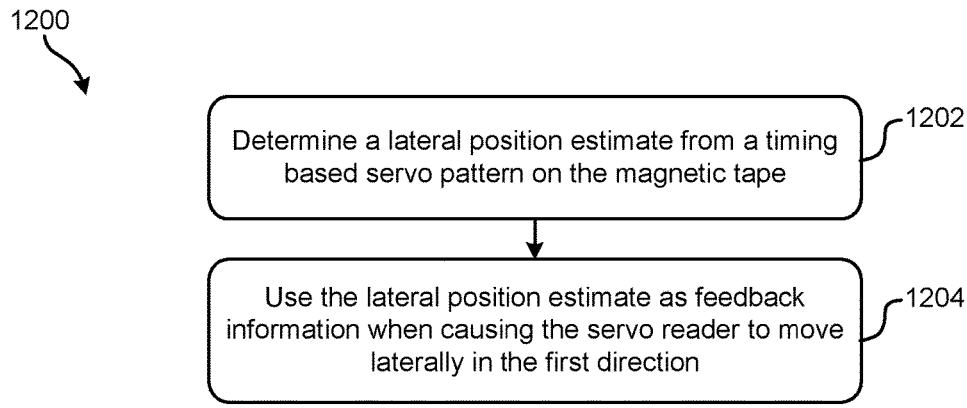
FIG. 12 is a flowchart of a method, according to one embodiment.

Depending on the approach, causing the servo reader to move laterally along the width of one or more HD servo tracks in the cross-track direction may incorporate a reference lateral position of the servo reader. Looking to FIG. 12, a flowchart of a method 1200 for causing the servo reader to move laterally the width of one or more HD servo tracks is illustrated in accordance with one embodiment. The method 1200 may be performed in accordance with the present invention in any of the environments depicted in FIGS. 1-11D, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

Operation 1202 of method 1200 includes determining a lateral position estimate from a TBS pattern on the magnetic tape. As mentioned above, in some embodiments, the movement of the servo reader laterally corresponds to a reference lateral position of the servo reader with respect to the HD servo pattern. However, depending on the approach, the reference lateral position of the servo reader may vary, e.g., depending on whether TBS information is available.

In some approaches, the reference lateral position may merely be a randomly selected lateral position in the HD servo pattern on the magnetic tape along the cross-track direction. A randomly selected reference lateral position may be chosen in situations where TBS information is not available. In such instances, the lateral movement of the servo reader may be performed by first blindly detecting the presence of the HD pattern in the readback servo signal. An estimation of the head lateral position may be made using the blind detection of the HD pattern. A feedforward control signal (e.g., a current) may then be applied to a head actuator to achieve the desired motion in the first and/or second lateral (cross-track) directions irrespective of the actual position of the head relative to the tape, e.g., implemented as an open loop control system.

Alternatively, in some approaches involving an HD servo pattern for which TBS information is not available, the number of tone frequencies is greater than or equal to three, and the width of the HD servo reader greater than the width of an HD servo track, a reliable estimation of the maximum energy values for each periodic waveform may be obtained by using closed-loop track-following operations. The reference lateral position may correspond to the servo reader being centered over one of the at least two periodic waveforms of the HD servo pattern along the cross-track direction (perpendicular to a longitudinal axis of the HD servo pattern). In such approaches, the reference lateral position may be determined using plots of the energy values for each of the periodic waveforms, e.g., as seen in FIGS. 11B-11D. Accordingly, the reference lateral position may be selected as the position of the servo reader corresponding to the center of a plateau in an energy vs. time plot of the readback signal. In other words, the reference lateral position may be selected as the value that corresponds to the HD servo reader lateral position, for which three or more frequencies are observed in the read back signal, and the detected energy values of the two waveforms that are written adjacent to the centered waveform are equal. In still other approaches, the reference lateral position may correspond to the servo reader being centered over a transition between two of the periodic waveforms of the HD servo pattern along the cross-track direction.

Furthermore, operation 1204 includes using the lateral position estimate as feedback information when causing the servo reader to move laterally in the first direction. Thus, according to some specific embodiments, one or both of the operations included in method 1200 may be implemented as a part of performing operation 902 and/or operation 912 of FIG. 9A above.

Gain parameters may further be updated depending on changes to the maximum energy values of periodic waveforms as described above. Looking now to FIG. 13, a flowchart of a method 1300 for updating gain parameters is shown according to one embodiment. The method 1300 may be performed in accordance with the present invention in any of the environments depicted in FIGS. 1-12, among others, in various embodiments. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

Figure 13:
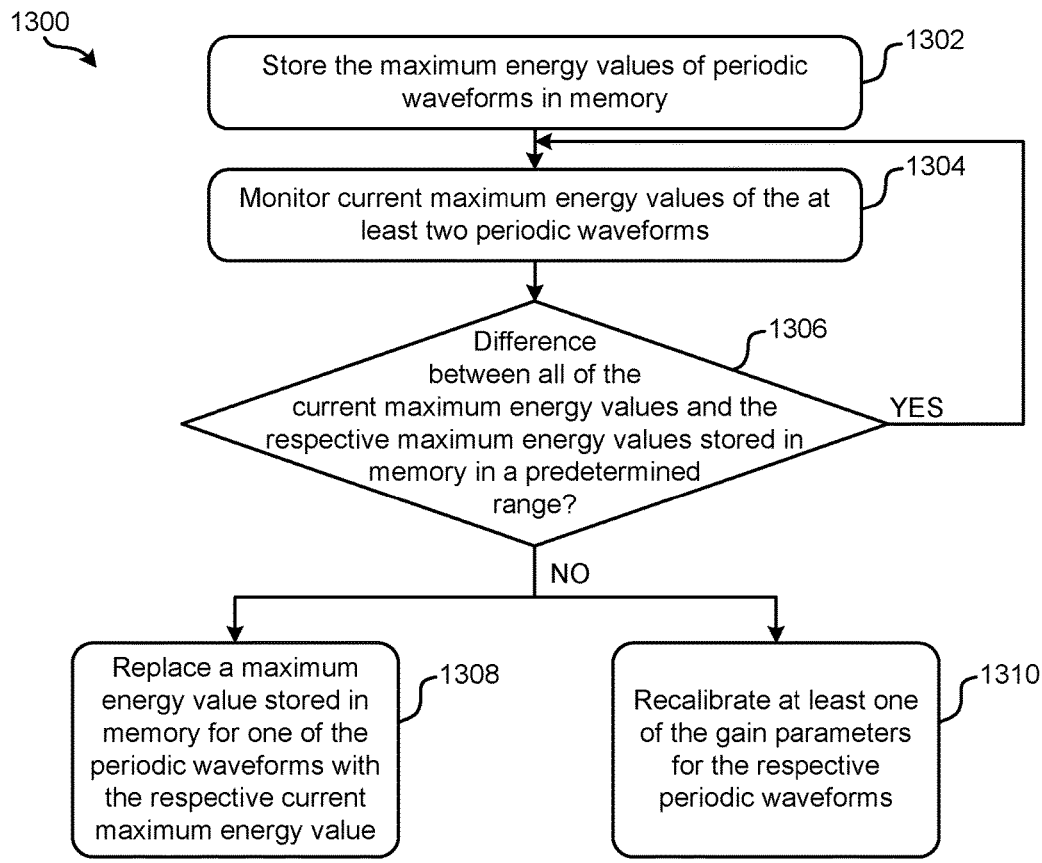
FIG. 13 is a flowchart of a method, according to one embodiment.

As shown in FIG. 13, operation 1302 of method 1300 includes storing the maximum energy value of each of the periodic waveforms in memory, e.g., such as a lookup table. As mentioned above, a high-density servo band includes a plurality of high-density servo tracks, the servo tracks including at least two patterns written at different frequencies which produce different periodic waveforms during readback. Thus, operation 1302 may include storing at least two maximum energy values in memory, each of the at least two maximum energy values corresponding to a respective periodic waveform. It should be noted that it may be desirable that the maximum energy value of each of the periodic waveforms be estimated and stored in memory for embodiments where a width of the servo reader is twice as wide as a width of an HD servo track. Moreover, the maximum energy values may initially be estimated (e.g., calculated) according to any of the approaches described herein.

Method 1300 also includes monitoring current maximum energy values of the at least two periodic waveforms. See operation 1304. According to some approaches, the monitoring may be performed during normal track-following operations, e.g., without causing the HD servo reader to move laterally along the HD servo pattern as shown in FIG. 11A. However, it should be noted that monitoring may be performed without causing the HD servo reader to move laterally along the HD servo pattern when the HD servo reader is known to fully cover at least one of the HD servo tracks during a track-following operation. In other words, when a width of the HD servo reader is at least as large as a width of an HD servo track. This is at least partly because during track-following operations, at any time there may exists at least one periodic waveform at a given frequency for which the measure of the corresponding energy value provided by the HD reader is at a maximum value if the HD servo reader is known to fully cover at least one of the HD servo tracks. Thus, over time each of the HD servo tracks are likely to be read during track-following operation, and as a result, the estimates of the maximum energy value for all frequencies are likely to be monitored, thereby increasing system robustness against slowly varying system characteristics. Moreover, part of the process of monitoring the current maximum energy values may include comparing the current values with corresponding maximum energy values stored in memory. Accordingly, changes to the maximum energy values may be more easily detected.

It follows that in general, monitoring may be performed during track-following operations which correspond to reference lateral positions such that a maximum of the energy value of a periodic waveform in the read back signal is observed with high probability, even in the presence of track-following errors. In some approaches, the current maximum energy values may be monitored by repeatedly checking plots of the energy values stored in memory for each of the periodic waveforms, e.g., as seen in FIGS. 11B-11D. In other approaches, the current maximum energy values may be monitored by repeatedly comparing them with corresponding maximum energy values stored in memory.

Referring still to FIG. 13, decision 1306 includes determining whether the difference between each of the current maximum energy values and the respective maximum energy values stored in memory is in a predetermined range. The predetermined range may be set by a user, accessed from a lookup table, depend on performance characteristics, etc. Depending on the size of the predetermined range, some variation (e.g., negligible variation) between the current and stored maximum energy values may not be actionable. Moreover, it should be noted that "in a predetermined range" is in no way intended to limit the invention. Rather than determining whether a value is in a predetermined range, equivalent determinations may be made, e.g., as to whether a value is above a threshold, whether a value is outside a predetermined range, whether an absolute value is above a threshold, whether a value is below a threshold, etc., depending on the desired approach.

As shown, method 1300 returns to operation 1304 in response to determining that the difference between each of the current maximum energy values and the respective maximum energy values stored in memory is in a predetermined range, whereby the current maximum energy values may continue to be monitored. However, method 1300 may proceed to operation 1308 or operation 1310 in response to determining that the difference between any one or more of the current maximum energy values and the respective maximum energy values stored in memory is in a predetermined range. Which of operation 1308 and operation 1310 is actually performed may depend on user preference, how far outside the predetermined range the difference is, system settings, etc.

Operation 1308 includes replacing a maximum energy value stored in memory for one of the periodic waveforms with the respective current maximum energy value, while operation 1310 includes recalibrating at least one of the gain parameters for the respective periodic waveforms.

As alluded to above, recalibration of one or more of the gain parameters may be performed each time a tape cartridge is loaded into a tape drive, during drive operation due to reader element wear, periodically after an amount of time, etc. However, a replacement of a maximum energy value stored in memory may be performed when a sufficient difference between the value stored in memory and the current maximum energy value is detected during normal operation. It should be noted that although operations 1308 and 1310 are shown in the present embodiment as being alternative choices (only one of them is performed), in other embodiments, both of operations 1308 and 1310 may be performed. Thus, a maximum energy value stored in memory for one of the periodic waveforms may be replaced with the respective current maximum energy value in addition to recalibrating at least one of the gain parameters for the respective periodic waveforms in response to determining that the difference between any one or more of the current maximum energy values and the respective maximum energy values stored in memory is in a predetermined range.

It follows that various embodiments described herein include an improved process of determining the gain parameters that are used for adjusting (e.g., prior to PES computation) the estimated energy values of periodic waveforms in an HD servo pattern. As a result, the achievable accuracy of detector characteristics may be significantly improved. As described herein, this improvement may be achieved for HD servo systems by moving an HD servo reader laterally across an HD servo pattern, preferably by an amount that spans the HD pattern width, and using the amplitude of the readback signal to derive an estimate of the maximum value of the energy of each of the periodic waveforms in the HD servo pattern written at different frequencies. The energy values may then be used to set the gain parameters for each of the periodic waveforms by averaging the maximum energy values. The gain parameter for the channel corresponding to the periodic waveform with the highest energy may be set equal to a predetermined value (e.g., a value of 1), while the remaining gain parameters may be normalized as described in any of the approaches included and/or suggested herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive-implemented method, comprising:
    causing a servo reader to move in a first direction over a high-density servo pattern which includes a plurality of high-density servo tracks, wherein each of the servo tracks includes at least two patterns written at different frequencies to produce different periodic waveforms during readback;
    receiving a readback signal from the servo reader as the servo reader moves in the first direction; and
    using the readback signal to set a gain parameter for each of the respective periodic waveforms.

2. The tape drive-implemented method as presented in claim 1, comprising:
    causing the servo reader to move in a second direction opposite the first direction over the high-density servo pattern;
    receiving a second readback signal from the servo reader as the servo reader moves in the second direction; and
    using amplitudes of the readback signal and the second readback signal to determine a maximum energy value of each of the at least two periodic waveforms,
    wherein using the readback signal to set the gain parameter for each of the respective periodic waveforms includes using the maximum energy values.

3. The tape drive-implemented method as presented in claim 2, wherein using the maximum energy values to set a gain parameter for each of the respective periodic waveforms includes identifying the highest maximum energy value and normalizing the gain parameters based on the highest maximum energy value.

4. The tape drive-implemented method as presented in claim 3, wherein using the maximum energy values to set a gain parameter for each of the respective periodic waveforms includes:
    setting a gain parameter corresponding to the periodic waveform with the highest maximum energy value equal to a predefined value; and
    normalizing the remaining gain parameters with respect to the highest maximum energy value using the predefined value.

5. The tape drive-implemented method as presented in claim 2, comprising:
    storing the maximum energy values of the at least two periodic waveforms in memory;
    monitoring current maximum energy values of the at least two periodic waveforms;
    determining whether a difference between each of the current maximum energy values and the respective maximum energy values stored in memory is in a predetermined range; and
    recalibrating at least one of the gain parameters for the respective periodic waveforms in response to determining that the difference between at least one of the current maximum energy values and the respective stored maximum energy value for the one of the periodic waveforms is not in the predetermined range.

6. A computer program product comprising a computer readable storage medium having program instructions embodied therewith, wherein the computer readable storage medium is not a transitory signal per se, the program instructions executable by a processor to cause the processor to:
    cause, by the processor, a servo reader to move in a first direction over a high-density servo pattern which includes a plurality of high-density servo tracks, wherein each of the servo tracks includes at least two patterns written at different frequencies to produce different periodic waveforms during readback;
    receive, by the processor, a readback signal from the servo reader as the servo reader moves in the first direction; and
    use, by the processor, the readback signal to set a gain parameter for each of the respective periodic waveforms.

7. The computer program product as presented in claim 6, the program instructions executable by the processor to cause the processor to:
    cause, by the processor, the servo reader to move in a second direction opposite the first direction over the high-density servo pattern;
    receive, by the processor, a second readback signal from the servo reader as the servo reader moves in the second direction; and
    use, by the processor, amplitudes of the readback signal and the second readback signal to determine a maximum energy value of each of the at least two periodic waveforms
    wherein using the readback signal to set the gain parameter for each of the respective periodic waveforms includes using the maximum energy values.

8. The computer program product as presented in claim 7, wherein using the maximum energy values to set a gain parameter for each of the respective periodic waveforms includes:
   identifying the highest maximum energy value;
   normalizing the gain parameters based on the highest maximum energy value;
   setting a gain parameter corresponding to the periodic waveform with the highest maximum energy value equal to a predefined value; and
   normalizing the remaining gain parameters with respect to the highest maximum energy value using the predefined value.

9. The computer program product as presented in claim 7, the program instructions executable by the processor to cause the processor to:
   store, by the processor, the maximum energy values of the at least two periodic waveforms in memory;
   monitor, by the processor, current maximum energy values of the at least two periodic waveforms;
   determine, by the processor whether a difference between each of the current maximum energy values and the respective maximum energy values stored in memory is in a predetermined range; and
   replace, by the processor, a maximum energy value stored in memory for one of the periodic waveforms with the respective current maximum energy value in response to determining that the difference between the current maximum energy value and the respective stored maximum energy value for the one of the periodic waveforms is not in the predetermined range.

10. A tape drive, comprising:
    a controller comprising logic integrated with and/or executable by the controller to cause the controller to:
    cause a servo reader to move in a first direction over a high-density servo pattern which includes a plurality of high-density servo tracks, wherein each of the servo tracks includes at least two patterns written at different frequencies to produce different periodic waveforms during readback;
    receive a readback signal from the servo reader as the servo reader moves in the first direction; and
    use the readback signal to set a gain parameter for each of the respective periodic waveforms.

11. The tape drive as presented in claim 10, comprising:
    causing the servo reader to move in a second direction opposite the first direction over the high-density servo pattern;
    receiving a second readback signal from the servo reader as the servo reader moves in the second direction; and
    using amplitudes of the readback signal and the second readback signal to determine a maximum energy value of each of the at least two periodic waveforms,
    wherein using the readback signal to set the gain parameter for each of the respective periodic waveforms includes using the maximum energy values.

12. The tape drive as presented in claim 11, wherein using the maximum energy values to set a gain parameter for each of the respective periodic waveforms includes identifying the highest maximum energy value and normalizing the gain parameters based on the highest maximum energy value.

13. The tape drive as presented in claim 12, wherein using the maximum energy values to set a gain parameter for each of the respective periodic waveforms includes:
    setting a gain parameter corresponding to the periodic waveform with the highest maximum energy value equal to a predefined value; and
    normalizing the remaining gain parameters with respect to the highest maximum energy value using the predefined value.

14. The tape drive as presented in claim 11, comprising:
    storing the maximum energy values of the at least two periodic waveforms in memory;
    monitoring current maximum energy values of the at least two periodic waveforms;
    determining whether a difference between each of the current maximum energy values and the respective maximum energy values stored in memory is in a predetermined range; and
    replacing a maximum energy value stored in memory for one of the periodic waveforms with the respective current maximum energy value in response to determining that the difference between the current maximum energy value and the respective stored maximum energy value for the one of the periodic waveforms is not in the predetermined range.

15. The tape drive as presented in claim 14, wherein the monitoring is performed during normal track-following operations.

16. The tape drive as presented in claim 11, comprising:
    storing the maximum energy values of the at least two periodic waveforms in memory;
    monitoring current maximum energy values of the at least two periodic waveforms;
    determining whether a difference between each of the current maximum energy values and the respective maximum energy values stored in memory is in a predetermined range; and
    recalibrating at least one of the gain parameters for the respective periodic waveforms in response to determining that the difference between at least one of the current maximum energy values and the respective stored maximum energy value for the one of the periodic waveforms is not in the predetermined range.

17. The tape drive as presented in claim 10, wherein causing the servo reader to move in the first direction corresponds to a reference position of the servo reader with respect to the high-density servo pattern.

18. The tape drive as presented in claim 17, wherein the reference position either corresponds to the servo reader being centered over one of the at least two periodic waveforms of the high-density servo pattern, or is a randomly selected position in the high-density servo pattern on a magnetic tape.

19. The tape drive as presented in claim 10, wherein the high-density servo pattern includes a duplicate high-density servo track having a pattern written at a same frequency as the frequency of a pattern included in one of the plurality of high-density servo tracks, wherein the same frequency produces a same periodic waveform during readback, wherein using the maximum energy values to set a gain parameter for the same periodic waveform includes: averaging the maximum energy value corresponding to the duplicate high-density servo track with the maximum energy value corresponding to the one of the plurality of high-density servo tracks; and using the average maximum energy value to set the gain parameter for the same periodic waveform.

20. The tape drive as presented in claim 10, comprising:
    determining a lateral position estimate from a timing-based servo pattern; and
    using the lateral position estimate as feedback information when causing the servo reader to move in the first direction.

* * * * *